(12) United States Patent
Zhang et al.

(10) Patent No.: US 8,539,957 B2
(45) Date of Patent: Sep. 24, 2013

(54) CIGARETTES AND CIGARETTE FILTERS INCLUDING ACTIVATED CARBON FOR REMOVING NITRIC OXIDE

(75) Inventors: Wei-Jun Zhang, Richmond, VA (US); Mark Zhuang, Richmond, VA (US); Shahryar Rabiei, Richmond, VA (US); Firooz Rasouli, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 1705 days.

(21) Appl. No.: 11/305,338

(22) Filed: Dec. 19, 2005

(65) Prior Publication Data

US 2006/0201524 A1 Sep. 14, 2006

Related U.S. Application Data

(60) Provisional application No. 60/643,607, filed on Jan. 14, 2005.

(51) Int. Cl.
 *A24D 3/06* (2006.01)
(52) U.S. Cl.
 USPC ............ 131/342; 131/341; 131/344; 131/331
(58) Field of Classification Search
 None
 See application file for complete search history.

(56) References Cited

U.S. PATENT DOCUMENTS

| | | | |
|---|---|---|---|
| 5,322,075 A | 6/1994 | Deevi et al. | |
| 5,499,636 A | 3/1996 | Baggett, Jr. et al. | |
| 5,591,368 A | 1/1997 | Fleischhauer et al. | |
| 5,666,976 A | 9/1997 | Adams et al. | |
| 5,692,525 A | 12/1997 | Counts et al. | |
| 5,692,526 A | 12/1997 | Adams et al. | |
| 5,827,355 A * | 10/1998 | Wilson et al. ............ | 95/114 |
| 5,915,387 A | 6/1999 | Baggett, Jr. et al. | |
| 5,934,289 A | 8/1999 | Watkins et al. | |
| 5,988,176 A | 11/1999 | Baggett, Jr. et al. | |
| 6,026,820 A | 2/2000 | Baggett, Jr. et al. | |
| 6,053,176 A | 4/2000 | Adams et al. | |
| 2003/0092560 A1 * | 5/2003 | Von Blucher et al. ......... | 502/10 |
| 2003/0154993 A1 * | 8/2003 | Paine et al. .................. | 131/341 |
| 2003/0220195 A1 * | 11/2003 | Axtell et al. ................. | 502/417 |
| 2004/0129280 A1 * | 7/2004 | Woodson et al. ............ | 131/194 |

FOREIGN PATENT DOCUMENTS

WO WO 0237990 A2 * 5/2002

OTHER PUBLICATIONS

Pure Appl. Chem., 73(2)381-394 (2001).

* cited by examiner

*Primary Examiner* — Michael J Felton
(74) *Attorney, Agent, or Firm* — Buchanan Ingersoll & Rooney PC

(57) ABSTRACT

Filters and cigarettes include an activated carbon sorbent capable of selectively removing nitric oxide from mainstream tobacco smoke. Methods for making cigarette filters and cigarettes using the activated carbon sorbent and methods for treating mainstream tobacco smoke produced by smoking a cigarette comprising the sorbent are also provided.

10 Claims, 3 Drawing Sheets

CIGARETTES AND CIGARETTE FILTERS INCLUDING ACTIVATED CARBON FOR REMOVING NITRIC OXIDE

This application claims priority under 35 U.S.C. §119 to U.S. Provisional Application No. 60/643,607 entitled CIGARETTES AND CIGARETTE FILTERS INCLUDING ACTIVATED CARBON FOR REMOVING NITRIC OXIDE, filed Jan. 14, 2005, the entire content of which is hereby incorporated by reference.

BACKGROUND

Absorbent and adsorbent materials have been suggested for incorporation into smoking articles, such as cigarettes, for the purpose of removing constituents from mainstream smoke.

SUMMARY

Cigarette filters, cigarettes including the cigarette filters, methods for making the cigarette filters and cigarettes, and methods for removing gaseous constituents from gas streams; such as from mainstream tobarro smoke, are provided.

In a preferred embodiment, the cigarette filter contains an activated carbon sorbent that has a pore structure effective to remove nitric oxide (i.e., NO) from mainstream tobacco smoke.

In a preferred embodiment, a majority of the pores of the activated carbon sorbent have a pore size of less than about 30 Å, e.g., from about 5 Å to about 20 Å, or from about 5 Å to about 10 Å.

In a preferred embodiment, the activated carbon sorbent contains pores having a D-R micropore volume of from about 0.2 $cm^3/g$ to about 1.0 $cm^3/g$ in the pore size range of from about 5 Å to about 10 Å.

In another preferred embodiment, the filter also contains a catalyst capable of catalyzing the reaction of nitric oxide to $N_2$ and $O_2$ and/or to $NO_2$.

In a preferred embodiment, the activated carbon sorbent is used to remove nitric oxide from a gas stream.

A preferred embodiment of a method of making a cigarette filter comprises incorporating an activated carbon sorbent into a filter, at one or more parts of the filter.

A preferred embodiment of a method of making a cigarette comprises placing a paper wrapper around a tobacco column to form a tobacco rod, and attaching a cigarette filter including an activated carbon sorbent to the tobacco rod to form the cigarette.

A preferred embodiment of treating tobacco smoke comprises heating or lighting the cigarette to form smoke, and drawing the smoke through a cigarette filter of the cigarette. An activated carbon sorbent provided in the cigarette removes nitric oxide from mainstream smoke.

BRIEF DESCRIPTION OF THE DRAWING FIGURES

Figure 5:
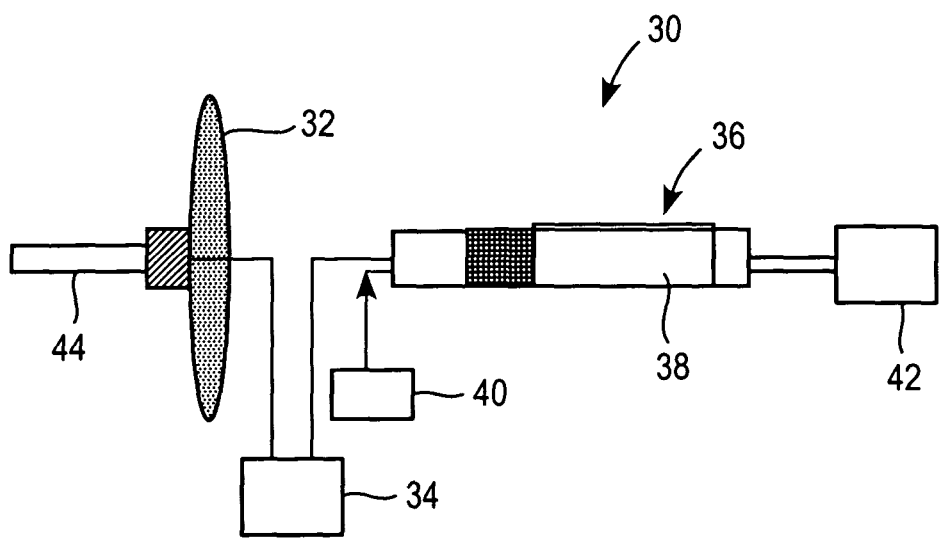

FIG. 5 schematically illustrates a smoking test system used for testing cigarettes for NO removal efficiency.

Figure 6:
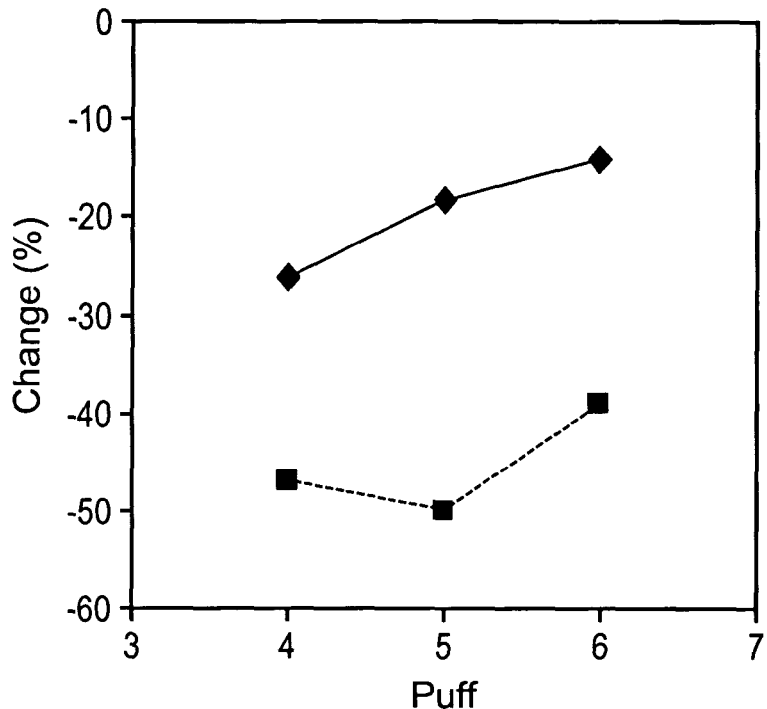

FIG. 6 shows the % change of NO contained in a gas composition for consecutive puffs using as-received carbon derived from coconut shells and treated carbon derived from coconut shells.

Figure 7:
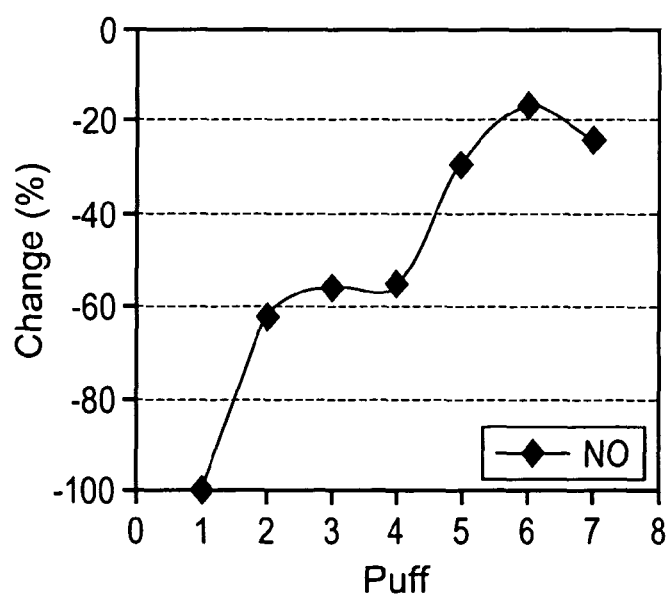

FIG. 7 shows the % change of NO contained in a gas composition for consecutive puffs using treated carbon derived from coconut shells.

DETAILED DESCRIPTION OF PREFERRED EMBODIMENTS

Cigarette filters and cigarettes are provided that include an activated carbon sorbent capable of removing nitric oxide from mainstream tobacco smoke. Methods of making the cigarette filters and cigarettes, as well as methods of treating cigarette smoke using filters including the activated carbon sorbent, are also described. Methods of removing nitric oxide from a gas stream are also described.

As used herein, the term "sorption" includes filtration by adsorption and/or adsorption. Sorption encompasses interactions on the outer surface of the sorbent, as well as interactions within the pores and channels of the sorbent. In other words, a "sorbent" is a substance that can condense or hold molecules of other substances on its surface, and/or can take up other substances, i.e., through penetration of the other substances into its inner structure, or into its pores. Accordingly, the term "sorbent" as used herein refers to an adsorbent, an absorbent, or a substance that can function as both an adsorbent and an absorbent.

As used herein, the term "remove" refers to adsorption and/or absorption of at least some portion of at least one constituent of a gas stream, such as mainstream tobacco smoke. At least one constituent of a gas stream may be converted to another constituent by a catalytic reaction, which effectively also removes the constituent from the gas stream.

The term "mainstream smoke" includes the mixture of gases that pass down the tobacco rod and issue through the filter end, i.e., the smoke that issues or is drawn from the mouth end of a smoking article during smoking of the smoking article. Mainstream smoke contains air that is drawn in through both the lit region of the smoking article and through the paper wrapper.

The activated carbon sorbent preferably has a pore structure that is made up substantially of micropores or mesopores. As used herein, a "micropore" has a pore size of about 2 nm (20 Å) or less, and a "mesopore" has a pore size of from about 2 nm to about 50 nm (20 Å to 500 Å). See, for example, *Pure Appl. Chem.*, Vol. 73, No. 2, pp. 381-394 (2001). The pore size of the activated carbon sorbent can be chosen based on the selected constituent(s) that is/are desired to be removed from a gas stream, e.g., from mainstream tobacco smoke.

If desired, the activated carbon sorbent can be used in combination with one or more catalyst materials in a gas passage, e.g., in a cigarette filter and/or cigarette, to enhance conversion of one or more selected constituents in the gas stream to another gaseous constituent. In a preferred embodiment, a catalyst material capable of catalyzing the reaction of nitric oxide to $N_2$ and $O_2$ and/or to $N_2$ is provided in the cigarette filter. For example, the catalyst can be any suitable transition metal catalyst, such as $Fe_2O_3$ and/or $Fe_3O_4$. The catalyst can be nano-sized and/or micro-sized. The catalyst can be provided in various components of a cigarette filter, e.g., on the activated carbon sorbent as a coating. Alternatively, the activated carbon sorbent and the catalyst can be in the form of a physical mixture in the gas passage.

The activated carbon sorbent is preferably incorporated in a traditional cigarette or a non-traditional cigarette. For example, the activated carbon sorbent can be incorporated in a cigarette with or without hollow cores, fuel elements or other arrangements, or in non-traditional cigarettes, such as cigarettes for electrical smoking systems described in commonly-assigned U.S. Pat. Nos. 6,026,820; 5,988,176; 5,915,387; 5,692,526; 5,692,525; 5,666,976 and 5,499,636, each of which is incorporated herein by reference in its entirety.

The activated carbon sorbent can be provided in gas passages, e.g., in cigarettes, in various physical forms. For example, the activated carbon sorbent can be in the form of beads, fibers, monolithic bodies, granules and/or a coating on a substrate. In a preferred embodiment, the activated carbon sorbent is in the form of spherical beads to achieve a desired resistance-to-draw (RTD). The beads can typically have an average diameter of from about 0.2 mm to about 1 mm, with 0.3 mm to 0.5 mm beads being preferred to achieve a desired RTD.

Monolithic bodies of activated carbon sorbent can have a cylindrical shape, as well as various other shapes that may include oval or polygonal cross sectional shapes, sheet-like, spherical, honeycomb, or other monolithic shapes, and the like. The monolithic bodies can have different sizes. For example, when used in monolithic form in a cigarette filter, the activated carbon sorbent can be disc-shaped or cylindrical, and preferably has a length of from about 2 mm to about 20 mm and a diameter slightly less than the diameter the filter portion of the cigarette.

In a preferred embodiment, the monolithic body is oriented in a gas passage, such as a cigarette filter, so that the body extends lengthwise along the length direction of the gas passage. Such orientation of the sorbent increases the length of the flow path through the sorbent traveled by the gas, such as mainstream tobacco smoke, thus exposing the gas to an increased total surface area of pores. Accordingly, the removal of nitric oxide from the gas stream by the sorbent can be increased.

The activated carbon sorbent includes pores having pore sizes effective to remove nitric oxide from a gas stream, such as from mainstream tobacco smoke. While not wishing to be bound to any particular theory, it is believed that the removal of NO from a gas stream by the sorbent involves the adsorption of NO by the surface through micropore filling.

The activated carbon sorbent can be produced by processing a suitable carbonaceous material or carbon-yielding precursor. The activated carbon sorbent is preferably produced from carbon beads, or from natural or synthetic organic materials, e.g., from coconut shells. Carbonaceous materials can include non-porous carbon and porous carbon. Porous carbon materials include materials, such as carbon molecular sieves.

Carbonaceous materials are subjected to an activation process to produce an activated carbon sorbent having a desired pore structure. Porous carbon materials are subjected to activation to modify the existing pore structure by forming additional pores and changing the existing pore size distribution.

The activation step utilizes any suitable oxygen-containing environment, which contains steam, carbon dioxide, oxygen or potassium hydroxide solution, at an elevated temperature, e.g., from about 400° C. to about 900° C. The environment can also contain other gases, such as nitrogen. These gases react with the carbon, resulting in a porous carbon structure. Oxygen and nitrogen can also be chemically attached to the carbon surface to enhance gas filtration selectivity based on chemisorption, i.e., the formation of a covalent bond.

In a preferred embodiment, the carbonaceous material is activated to a desired level of burn-off. The "burn-off" represents the weight loss (i.e., weight loss=initial weight−final weight) of the carbon that occurs during the activation process. As the level of burn-off is increased, the carbon surface area increases. The BET (Brunauer, Emmett and Teller) surface area of the activated carbon sorbent is preferably from about 1000 $m^2/g$ to about 3,000 $m^2/g$, more preferably from about 1000 $m^2/g$ to about 2,000 $m^2/g$.

The Dubinin-Redushkevich (D-R) micropore volume of those pores of the activated carbon sorbent that have a pore size of from about 5 Å to about 10 Å is preferably from about 0.2 $cm^3/g$ to about 1.0 $cm^3/g$, more preferably from about 0.3 $cm^3/g$ to about 1.0 $cm^3/g$. In a preferred embodiment, the activated carbon sorbent has a specific surface area of from about 1000 $m^2/g$ to about 2,000 $m^2/g$, and a D-R micropore volume of the pores that have a pore size of from about 5 Å to about 10 Å is from about 0.3 $cm^3/g$ to about 1.0 $cm^3/g$.

During activation, burn-off is preferably controlled to control the pore size, pore surface area and pore volume of the activated carbon sorbent. At a given activation temperature, increasing the activation time increases the BET surface area and the pore volume/gram (i.e., D-R value micropore volume) of the activated material. In addition, increasing the activation time can cause the growth of small pores, e.g., pores having a size of from about 5 Å to about 10 Å into larger pores, e.g., pores having a size of from about 10 Å to about 20 Å. Accordingly, the activation time is preferably controlled to control pore growth and provide a desired pore size distribution.

In a preferred embodiment, following activation, the activated carbon sorbent contains pores that are larger than the molecule size of one or more selected constituents of mainstream tobacco smoke that are targeted for removal. Only those constituents of the gas stream, e.g., mainstream tobacco smoke, that are small enough to enter into the pores of the sorbent can be adsorbed on the interior surface of the pores. Thus, constituents of the gas stream having sufficiently small molecular structures are selectively removed by the sorbent, while larger constituents, such as those that contribute to flavor in a cigarette, are not able to enter the pores and are substantially not removed from the gas stream by the sorbent.

As described above, the pore structure of the activated carbon sorbent can be adjusted in the manufacturing process by controlling the activation conditions. In a preferred embodiment, the activated carbon sorbent is processed to provide a pore size effective to selectively remove nitric oxide. Accordingly, the activated carbon sorbent includes pores that are larger than the size of the nitric oxide molecule. In a preferred embodiment, the majority of the pores of the activated carbon sorbent have a size of less than about 30 Å, more preferably less than about 20 Å, and most preferably less than about 10 Å.

In a preferred embodiment, the activated carbon sorbent is incorporated in the filter portion of a cigarette. In the filter portion, the activated carbon sorbent is preferably incorporated in at least one space and/or void.

The activated carbon sorbent also can be incorporated in the tobacco bed of a cigarette, such as in the tobacco rod.

The amount of the activated carbon sorbent provided in a cigarette can be varied. For example, about 50 mg to about 200 mg of the activated carbon sorbent can typically be used in a cigarette to provide sufficient filling and effective NO removal performance. More than 200 mg of activated carbon sorbent can be used. However, such embodiments may have a shorter tobacco rod in order to maintain a certain cigarette length. Increasing the amount of the sorbent in the filter can increase the total amount of NO that can be removed from mainstream tobacco smoke.

An exemplary embodiment of a method of making a cigarette filter comprises incorporating an activated carbon sorbent into a cigarette filter, wherein the activated carbon sorbent is capable of selectively removing nitric oxide from mainstream tobacco smoke. Any conventional or modified method of making cigarette filters may be used to incorporate the activated carbon sorbent in the cigarette.

Embodiments of methods for making cigarettes comprise placing a paper wrapper around a tobacco column to form a tobacco rod, and attaching a cigarette filter to the tobacco rod to form the cigarette. The cigarette filter and/or tobacco rod contains the activated carbon sorbent.

Any suitable technique for cigarette manufacture may be used to incorporate the activated carbon sorbent. The resulting cigarettes can be manufactured to any desired specification using standard or modified cigarette making techniques and equipment. The cigarettes may typically range from about 50 mm to about 120 mm in length.

Other preferred embodiments relate to methods of treating mainstream tobacco smoke, which involve heating or lighting the cigarette to form smoke and drawing the smoke through the cigarette, such that the activated carbon sorbent removes nitric oxide from mainstream smoke.

"Smoking" of a cigarette means the heating or combustion of the cigarette to form tobacco smoke. Generally, smoking of a traditional cigarette involves lighting one end of the cigarette and drawing the cigarette smoke through the mouth end of the cigarette, while the tobacco contained in the tobacco rod undergoes a combustion reaction. However, a non-traditional cigarette may be smoked by heating the cigarette using an electrical heater, as described, for example, in any one of commonly-assigned U.S. Pat. Nos. 6,053,176; 5,934,289; 5,591,368 and 5,322,075, each of which is incorporated herein by reference in its entirety.

Figure 1:
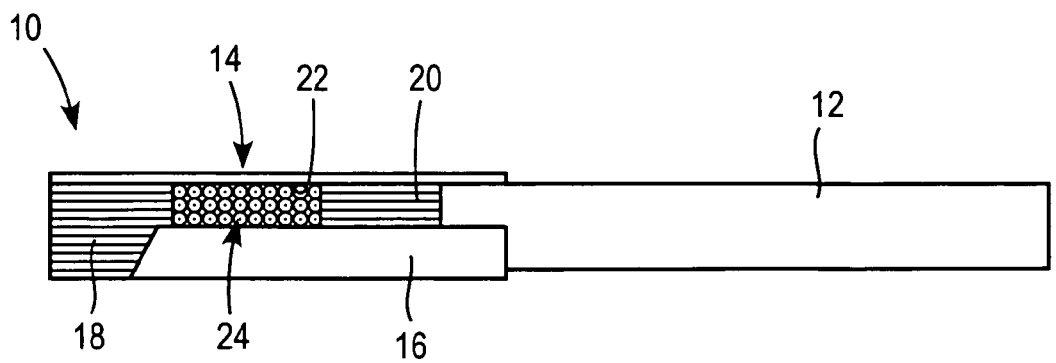
FIG. 1 is a partially-broken away side view of a preferred embodiment of a cigarette comprising a tobacco rod and a multi-component filter.

FIG. 1 shows a preferred embodiment of a cigarette 10 comprising a tobacco rod 12 and a multi-component filter 14 attached to the rod with tipping paper 16. The filter 14 has a plug-space-plug construction with spaced apart plugs 18, 20, such as cellulose acetate plugs, and a cavity 22 between the plugs 18, 20, which contain an activated carbon sorbent 24. In the embodiment, the activated carbon sorbent 24 is spherical beaded activated carbon. Other filter configurations can also be provided.

In a preferred embodiment, the beaded activated carbon sorbent 24 can comprise individual beads of a substantially uniform diameter. Such beads can form a bed that allows for minimal channeling of tobacco smoke drawn through the cavity 22. Accordingly, maximum contact can be achieved between mainstream cigarette smoke and the surface of the beads for efficient removal of NO from the smoke.

Figure 2:
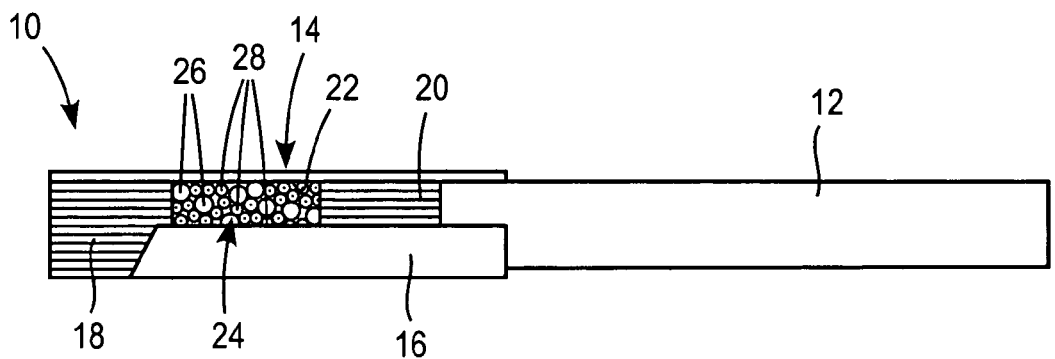
FIG. 2 is a partially-broken away side view of another preferred embodiment of a cigarette.

In another preferred embodiment, the filter cavity 22 can be filled with spherical carbon beads of at least two different size fractions. Smaller-size beads can pack uniformly between larger beads. For example, FIG. 2 shows a filter cavity 22 containing a combination of large beads 26 and smaller beads 28 packed uniformly between the larger beads.

EXAMPLE 1

Activated carbon beads were produced by activating as-received, porous carbon beads (molecular sieves) to modify the pore structure of the beads. The as-received beads had a BET surface area of less than 1000 m$^2$/g. Comparing the D-R micropore volume of the pores sized from 5 Å to 10 Å (i.e., 0.16 g/cm$^3$) to the value of the pores sized from 10 Å to 20 Å (i.e., 0.006 g/cm$^3$) shows that the as received beads contained a large percentage of pores sized from 5 Å to 10 Å.

The as-received carbon beads were activated in an environment containing $CO_2$ flowed at a flow rate of 0.3 L/min and $N_2$ flowed at a flow rate of 0.7 L/min and at a temperature of about 950° C. for different time periods ranging up to 270 minutes. The activation results are shown in Table 1.

An NO removal test was conducted at room temperature for the as received beads and the activated beads. The influent gas mixture contained 500 ppm NO, 10% $O_2$ and the balance helium. The gas mixture was flowed through the beads at a flow rate of 0.5 L/min. About 200 mg of the as-received beads and 200 mg of the activated beads were separately used n the testing.

TABLE 1

| Test | Activation Time (min) | % Burn-Off | BET Surface Area (m$^2$/g) | D-R Micropore Volume of Pores 5-10 Å (cm$^3$/g) | D-R Micropore Volume of Pores 10-20 Å (cm$^3$/g) | NO Removal After Saturation (ppm) | NO Removal After Saturation (%) |
|---|---|---|---|---|---|---|---|
| A | 0 | 0 | 980 | 0.16 | 0.006 | 150 | 30 |
| B | 45 | 12 | 1040 | 0.19 | 0.03 | 270 | 54 |
| C | 90 | 19 | 1370 | 0.31 | 0.14 | 310 | 62 |
| D | 180 | 33 | 1710 | 0.26 | 0.33 | 270 | 54 |
| E | 270 | 49 | 2430 | 0.20 | 0.61 | 230 | 46 |

As shown in Table 1, the % burn-off increased with increasing activation time at the activation temperature. In addition, the BET surface area of the activated carbon beads increased from under 1000 m$^2$/g (Test A) to about 2500 m$^2$/g (Test E). The D-R micropore volume of the micropores having a size of from about 5 Å to about 10 Å ranged from 0.16 cm$^3$/g (Test A) to 0.31 cm$^3$/g (Test C), while the D-R micropore volume of the micropores having a size of from about 10 Å to about 20 Å ranged from 0.006 (Test A) to 0.61 cm$^3$/g (Test E). As compared to a burn-off time of 90 minutes, the D-R micropore volume of the micropores having a size of from about 5 Å to about 10 Å decreased, while that of the micropores having a size of from about 10 Å to about 20 Å increased, for the higher burn-off times of 180 minutes and 270 minutes, demonstrating that smaller pores grew in size with increased burn-off time.

The results in Table 1 show that NO removal from the influent was highest for a burn-off time of 90 minutes. At higher burn-off times, NO removal from the influent gas mixture decreased. It is believed that that NO removal decreased due to the reduction in smaller pores relative to larger pores resulting from the longer activation times.

Figure 3:
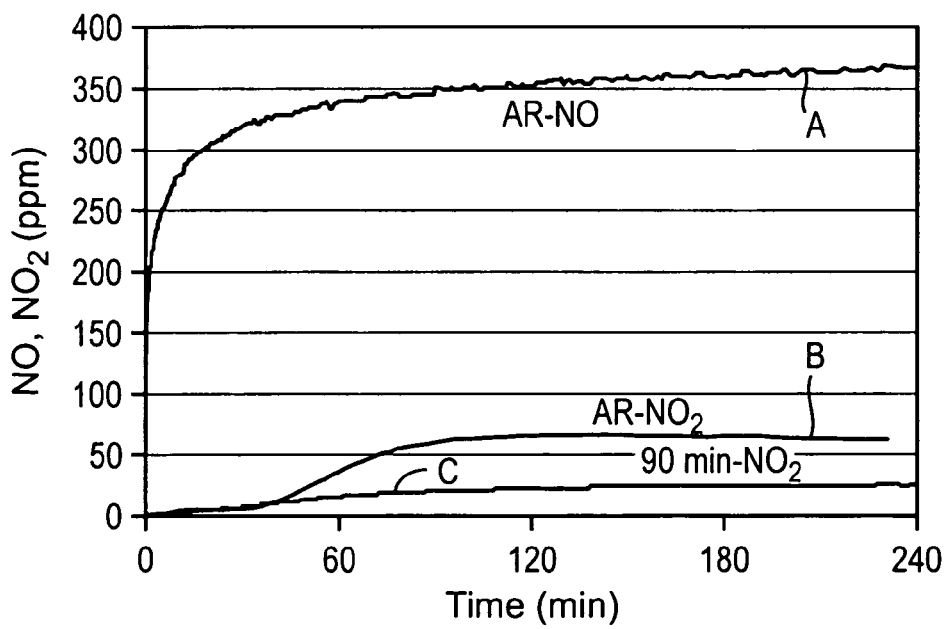
FIG. 3 shows the NO concentration (curve A) and the $NO_2$ concentration (curve B) versus time of an effluent gas using as-received porous carbon beads, and the $NO_2$ concentration (curve C) versus time of an effluent gas using activated carbon beads, for an influent gas mixture containing NO.

FIG. 3 shows the NO concentration (curve A) and the $NO_2$ concentration (curve B) of an effluent gas using the as-received porous carbon beads, and the $NO_2$ concentration (curve C) of an effluent gas using the activated carbon beads activated for 90 minutes. The influent was an NO, $O_2$ and helium gas mixture. As shown in curve B for the as-received beads, the $NO_2$ value initially increased to a value of about 60 ppm, and then remained at about this value for the duration of the test.

While not wishing to be bound by any particular theory, it is believed that the micropores of the as-received beads initially removed NO from the influent by adsorption until they became saturated after about 60 to 120 minutes of testing. It is believed that the saturated as-received beads acted predominately as a catalyst for the conversion of NO to $NO_2$ for the remainder of testing. As shown in curve C, the activated carbon was more effective than the as-received beads for initially removing NO by adsorption and also for catalyzing the conversion of NO to $NO_2$.

EXAMPLE 2

Tests were conducted to demonstrate the NO removal efficiency of carbon derived from coconut shells. Carbon derived from coconut shells having a D-R micropore volume for those pores sized from about 5 Å to about 10 Å of 0.18 $cm^3/g$, a D-R micropore volume for those pores sized from about 10 Å to about 20 Å of 0.28 $cm^3/g$, a BET surface area of about 1600 $m^2/g$, and an ash content of about 2.5%, were tested in the as-received state, and also after being treated at a temperature of 650° C. using a $CO_2$ flow of 0.2 L/min. for a period of 5 minutes. The treatment was conducted to modify the surface state of the carbon and enhance the NO adsorption capability of the carbon. About 200 mg of the as-received carbon and the treated carbon were separately used for testing.

Figure 4:
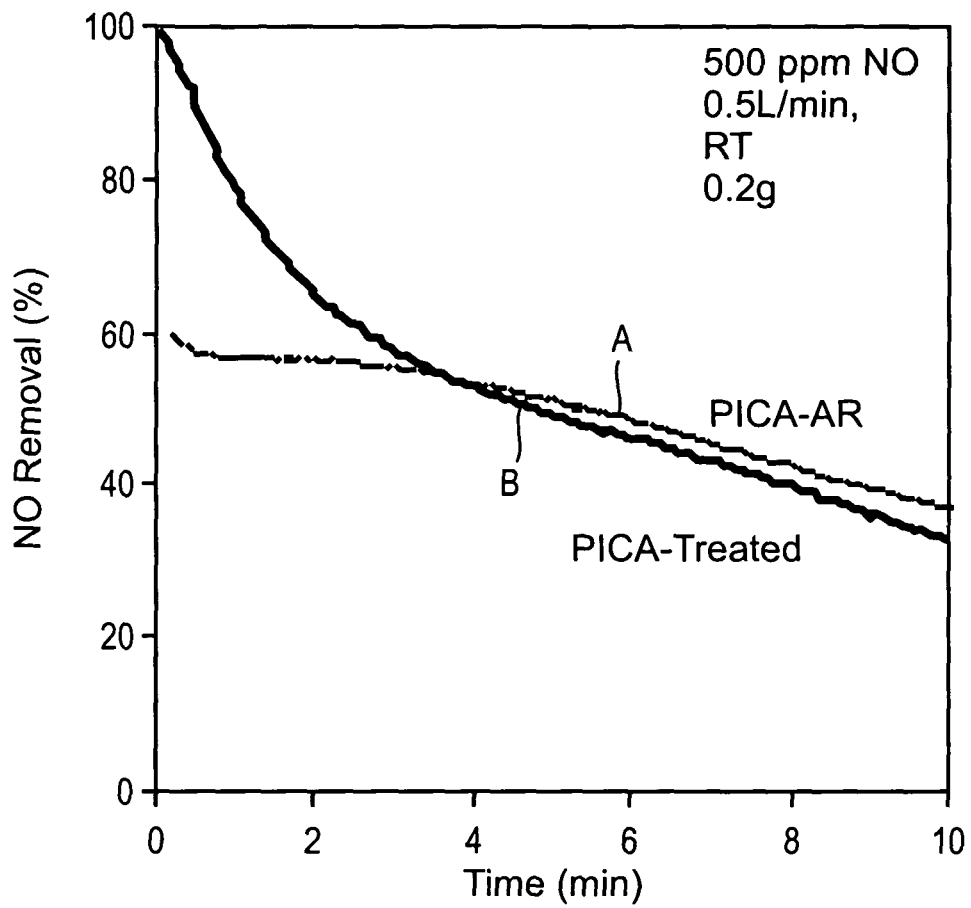
FIG. 4 shows the % NO removal versus time for as-received carbon derived from coconut shells (curve A) and treated carbon derived from coconut shells (curve B) of an effluent gas using an NO-containing gas mixture as the influent.

FIG. 4 shows curves of NO removal (%) versus time for the as-received carbon derived from coconut shells (curve A) and the treated carbon derived from coconut shells (curve B). The test results show that the treated carbon removed over 80% of the NO in the influent in the first minutes, while the as-received carbon removed a smaller percentage of the NO. Both the as-received and treated carbon reached a plateau, which is believed to signify that the micropores became saturated and the carbon subsequently acted predominately as a catalyst for the conversion of NO to $NO_2$.

EXAMPLE 3

Tests were conducted to demonstrate the NO removal efficiency of micro-porous carbon derived from coconut shells when used to filter cigarette smoke. A smoking test system 30 as shown in FIG. 5 was used for the testing. The smoking test system 30 includes a Cambridge pad 32, a smoking machine 34, a quartz tube 36 in which carbon 38 was placed, a carrier gas source 40, and a gas detector 42. A cigarette 44 was installed on the Cambridge pad 32, and lit to produce mainstream smoke. The mainstream smoke flowed into the quartz tube 36 and then into the detector 42, which analyzed the NO, CO and $CO_2$ content of the mainstream smoke.

FIG. 6 shows test results using as-received carbon derived from coconut shells and treated carbon derived from coconut shells, respectively. About 200 mg of the as-received carbon and about 200 mg of the treated carbon were placed in the quartz tube 36 for testing. In these figures, the change %=(test−control)/control·100). In the control, smoke passed through the quartz tube 36 without carbon.

As shown in FIG. 6, the as-received carbon provided an NO reduction from the mainstream smoke of only about 20%. In contrast, the treated carbon provided a higher NO reduction from the mainstream smoke of from about 40% to about 50%.

As shown in FIG. 7, the treated carbon derived from coconut shells provided an NO reduction from the mainstream smoke of at about 60% for the first four puffs.

While the invention has been described in detail with reference to preferred embodiments thereof, it will be apparent to one skilled in the art that various changes can be made, and equivalents employed, without departing from the scope of the invention.

What is claimed is:

1. A cigarette filter comprising an activated carbon sorbent, wherein a majority of the pores of the activated carbon sorbent have a size of less than about 30 Å, the activated carbon sorbent contains pores having a D-R micropore volume of from about 0.2 $cm^3/g$ to about 1.0 $cm^3/g$ in the pore size range of from about 5 Å to about 10 Å and pores having a D-R micropore volume of from 0.33 $cm^3/g$ to 0.61 $cm^3/g$ in the pore size range of from 10 Å to 20 Å, and the activated carbon sorbent is capable of removing nitric oxide from mainstream tobacco smoke, wherein the activated carbon sorbent is in the form of spherical beads.

2. The cigarette filter of claim 1, wherein (a) a majority of the pores of the activated carbon sorbent have a size of from about 5 Å to about 20 Å; (b) the activated carbon sorbent has a BET surface area of from about 1000 $m^2/g$ to about 3,000 $m^2/g$; or (c) the pores of the activated carbon sorbent that have a pore size of from about 5 Å to about 10 Å have a D-R micropore volume of from 0.3 $cm^3/g$ to about 1.0 $cm^3/g$, and the activated carbon sorbent has a specific surface area of about 1000 $m^2/g$ to about 2,000 $m^2/g$.

3. The cigarette filter of claim 1, wherein (a) the beads have a substantially uniform diameter; or (b) the beads are of at least two different size fractions.

4. A cigarette comprising a cigarette filter according to claim 1.

5. The cigarette of claim 4, which is a non-traditional cigarette.

6. The cigarette filter of claim 1, further comprising catalyst material capable of catalyzing the reaction of nitric oxide to $N_2$ and $O_2$ and/or to $NO_2$.

7. The cigarette filter of claim 6, wherein (a) the catalyst is $Fe_2O_3$ and/or $Fe_3O_4$; (b) the catalyst is nano-sized; (c) the catalyst is provided on the activated carbon sorbent; or (d) the activated carbon sorbent and the catalyst are in a physical mixture.

8. A cigarette comprising a cigarette filter according to claim 6.

9. The cigarette filter of claim 1, wherein the beads are of at least two different size fractions.

10. The cigarette filter of claim 1, wherein the activated carbon sorbent contains pores having a D-R micropore volume of from about 0.2 $cm^3/g$ to about 0.31 $cm^3/g$ in the pore size range of from about 5 Å to about 10 Å.

* * * * *